(12) United States Patent
Nishimoto et al.

(10) Patent No.: US 6,813,932 B2
(45) Date of Patent: Nov. 9, 2004

(54) MISFIRE DETECTION DEVICE FOR INTERNAL COMBUSTION ENGINE

(75) Inventors: Koji Nishimoto, Tokyo (JP); Takanori Fujimoto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/114,033

(22) Filed: Apr. 3, 2002

(65) Prior Publication Data

US 2003/0101797 A1 Jun. 5, 2003

(30) Foreign Application Priority Data

Dec. 4, 2001 (JP) ........................................ 2001-370032

(51) Int. Cl.$^7$ ............................. G01L 23/22; F02P 17/00
(52) U.S. Cl. ....................... 73/35.08; 324/399; 324/380
(58) Field of Search ............................ 73/35.08, 35.02, 73/35.04, 11.6; 324/380, 399; 701/101, 29; 123/310, 406.34, 479

(56) References Cited

U.S. PATENT DOCUMENTS

| 5,675,072 A | * | 10/1997 | Yasuda et al. ............. 73/35.08 |
| 5,781,012 A | * | 7/1998 | Yasuda ........................ 324/399 |
| 5,861,551 A | * | 1/1999 | Morita et al. .................. 73/116 |
| 5,945,828 A | * | 8/1999 | Katogi et al. ................ 324/399 |
| 6,092,015 A | * | 7/2000 | Takahashi et al. .......... 701/101 |
| 6,343,500 B1 | * | 2/2002 | Katogi et al. .............. 73/35.08 |

FOREIGN PATENT DOCUMENTS

| JP | 2000-240550 | 9/2000 |
| JP | 2001-107832 | 4/2001 |

* cited by examiner

*Primary Examiner*—Edward Lefkowitz
*Assistant Examiner*—Octavia Davis
(74) *Attorney, Agent, or Firm*—Sughrue Mion, PLLC (57) ABSTRACT

A misfire detecting device for an internal combustion engine including an ion current detecting means for detecting ion currents generated between electrodes of spark plugs; an ion current judging means for judging whether or not the ion current exists at each ignition cycle based on the ion current signal; a misfire judging means judging when no ion current is judged to exist based on an ion current judgment signal; an ignition coil; an ignition coil signal judging means for judging whether or not the ignition coil signal generated in synchronism with an ignition timing exists; and a failure judging means for judging whether or not an failure of the ion current detecting means occurs based on a result from the ignition coil signal judging means when the ion current signal is not detected.

2 Claims, 8 Drawing Sheets

A: Interruption at B75
B: Judged to be normal
C: Return
D: Whether or not VB signal is detected?
E: Judged to misfire
F: Whether or not signal b is detected
G: Failure on secondary winding side
H: Failure on primary winding side

MISFIRE DETECTION DEVICE FOR INTERNAL COMBUSTION ENGINE

BACKGROUND OF THE INVENTION

1. Field of the Invention

The present invention relates to a device for judging whether or not misfire occurs by detecting an ion current generated between electrodes of spark plug, in particular to a misfire detecting device for internal combustion engines, in which erroneous judgment of misfire is prevented by judging whether or not an ion current detecting means fails.

2. Description of Background Art

In internal combustion engines including a plurality of cylinders, e.g. for cylinders, driven in synchronism with a crank shaft, a microcomputer including an ECU ordinarily controls the engine to repeat four cycles of intake, compression, explosion, and exhaust of fuel, i.e. air-fuel mixture. If fuel compressed by a piston does not optimally and completely burned, an abnormal load is applied to the other cylinders, whereby there are dangers that the engine is destroyed and various troubles are brought about by an outward flow of the unburnt gas.

For example, in order to prevent a damage to a catalyst for treating exhaust gas by the unburnt gas, fuel supply to the cylinder, in which the misfire is detected, is stopped. Accordingly, in order to secure the internal combustion engine and the catalyst, it is necessary to continuously detect whether or not fuel is completely burnt in each of the cylinders. In a conventional technique, a device detecting an ion current generated between gaps of spark plus in explosion strokes and judging whether or not misfire occurs, for example, judging that misfire occurs when the level of the ion current is a predetermined value or less, is proposed.

Figure 8:
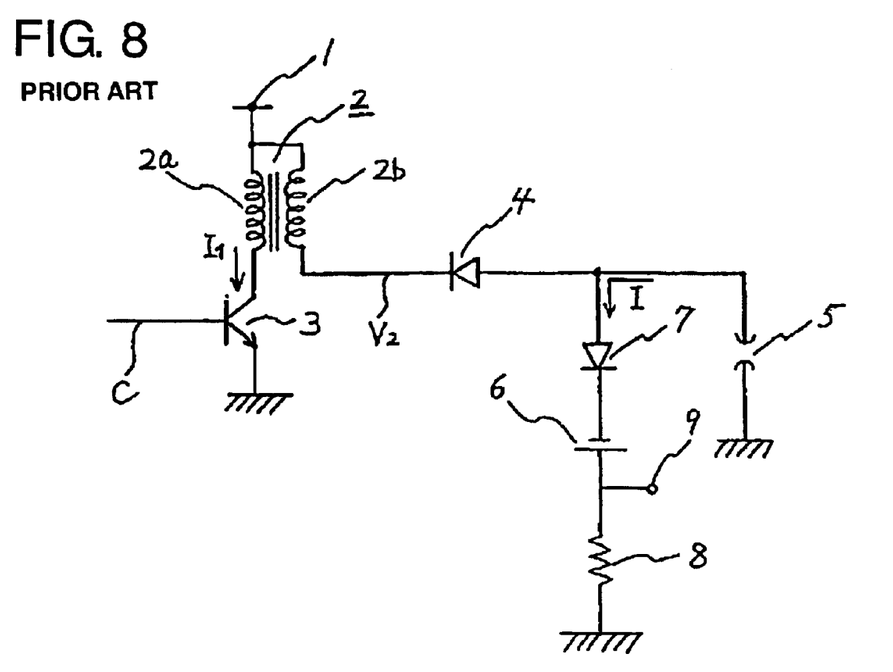
FIG. 8 is a circuit diagram of the misfire detecting device in the conventional internal combustion engine.

FIG. 8 is a circuit diagram of a generally-used conventional misfire detecting device of internal combustion engine. In the figure, only a cylinder is shown. However, the device is respectively provided in correspondence with all cylinders in a practical application. Numerical reference 1 designates a power source connected to a battery; numerical reference 2 designates an ignition coil including a primary winding 2a and a secondary winding 2b, one ends of the windings are connected to the power source 1; numerical reference 3 designates a power transistor inserted between the primary winding 2a and a ground; and numerical reference 4 designates a diode for preventing a back current flow, the cathode of the diode is connected to the secondary winding 2b.

Numerical reference 5 designates a spark plug, one end of which is connected to the secondary winding 2b through the diode 4 and the other end is grounded, wherein the spark plugs are provided in correspondence with a plurality of cylinders so as to be exposed in each combustion chamber. Numerical reference 6 designates a power source for detecting an ion current, the power source is connected to the anode of the diode 4; numerical reference 7 designates a diode for preventing a back current flow, the diode is inserted between the contact of the diode 4 with the spark plug 5 and the power source 6; numerical reference 8 designates a resistor inserted between the power source 6 and a ground; and numerical reference 9 designates an output terminal for detecting the ion current, the output terminal is located in the contact of the power source 6 with the resistor 8.

Figure 9:
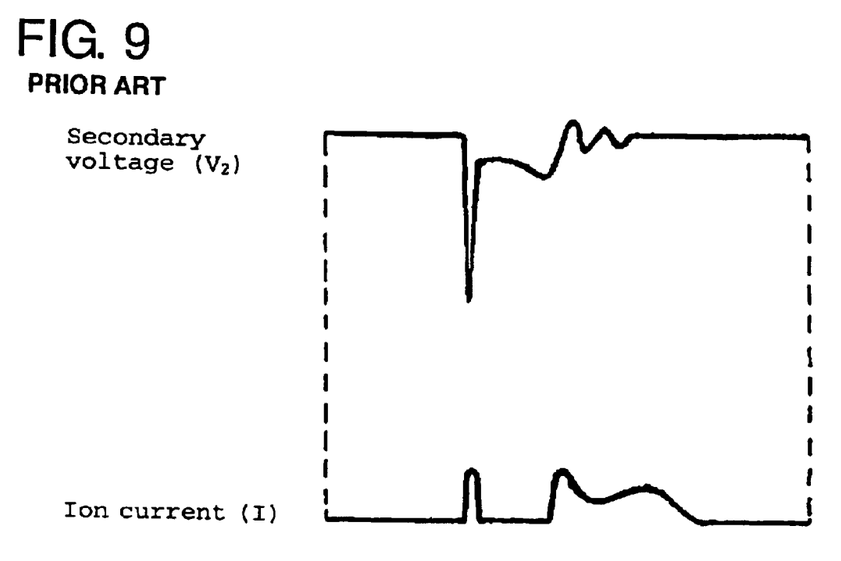
FIG. 9 shows waveforms of common ignition voltage and ion current in the conventional technique.

Next, an operation will be described in reference of FIGS. 8 and 9. In an ignition cycle, the power transistor 3 is controlled to turn on or off by a control signal C from an ECU (not shown). When a primary current I1 flowing through the primary winding 2a is cut off, a secondary voltage V2 having a negative high voltage is induced in the secondary winding 2b. Accordingly, spark is generated in the spark plug 5 and fuel in the combustion chamber is exploded. A discharge period is ordinarily 1 to 1.5 mmsec.

When the fuel is normally exploded in the explosion (ignition) stroke, a large number of positive ions are produced in the combustion chamber. The positive ion flow as the ion current I from the electrode of the spark plug 5 through the diode 7 to the power source 6, and further to the ground through the resistor 8. Accordingly, by detecting the amount of voltage drop in the resistor 8, it is possible to know the level of the ion current I, whereby it is possible to judge whether or not the combustion is normally completed.

The level of ion current I is outputted from the output terminal 9 to the ECU. The ECU judges whether or not the combustion is normally completed in the cylinder which is controlled to ignite. When an error such as misfire is judged to exist, an ignition timing is controlled to feed back, or processes such as fuel cut and cessation of cylinder are conducted to prevent danger.

However, since in the conventional misfire detecting device for internal combustion engine, misfire is judged based on only the ion current I, there is a problem that the ECU erroneously judges that misfire exists in the engine because when wires between the cylinders and the ion current detecting portion or a transmission wire between the output terminal for detecting the ion current and the ECU, and so on are disconnected or shorted or a circuit element is broken it becomes difficult to detect the ion current I.

SUMMARY OF THE INVENTION

It is an object of the present invention to solve the above-mentioned problems inherent in the conventional technique and to provide a misfire detecting device for an internal combustion engine comprising: an ion current detecting means for detecting ion currents generated between electrodes of spark plugs corresponding to a plurality of cylinders; an ion current judging means for judging whether or not the ion current exists at each ignition cycle of each cylinder based on the ion current signal from the ion current detecting means; a misfire judging means for judging that a misfire occurs when no ion current is judged to exist based on an ion current judgment signal from the ion current judging means; an ignition coil for generating an ignition signal for each of the spark plugs; an ignition coil signal judging means for judging whether or not the ignition coil signal generated in synchronism with ignition timing of the ignition coil exists; and a failure judging means for judging whether or not an failure of the ion current detecting means occurs based on a result from the ignition coil signal judging means in a case where the ion current signal is not detected.

According to a second aspect of the present invention, there is provided the misfire detecting device for internal combustion engine, wherein the failure judging means judges whether or not a failure of the ion current detecting means exists in a predetermined running range where the ion current signal is detectable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference of FIGS. 1 through 9 as follows, wherein the same numerical references are used for the same or similar portions and description of these portions is omitted.

Figure 1:
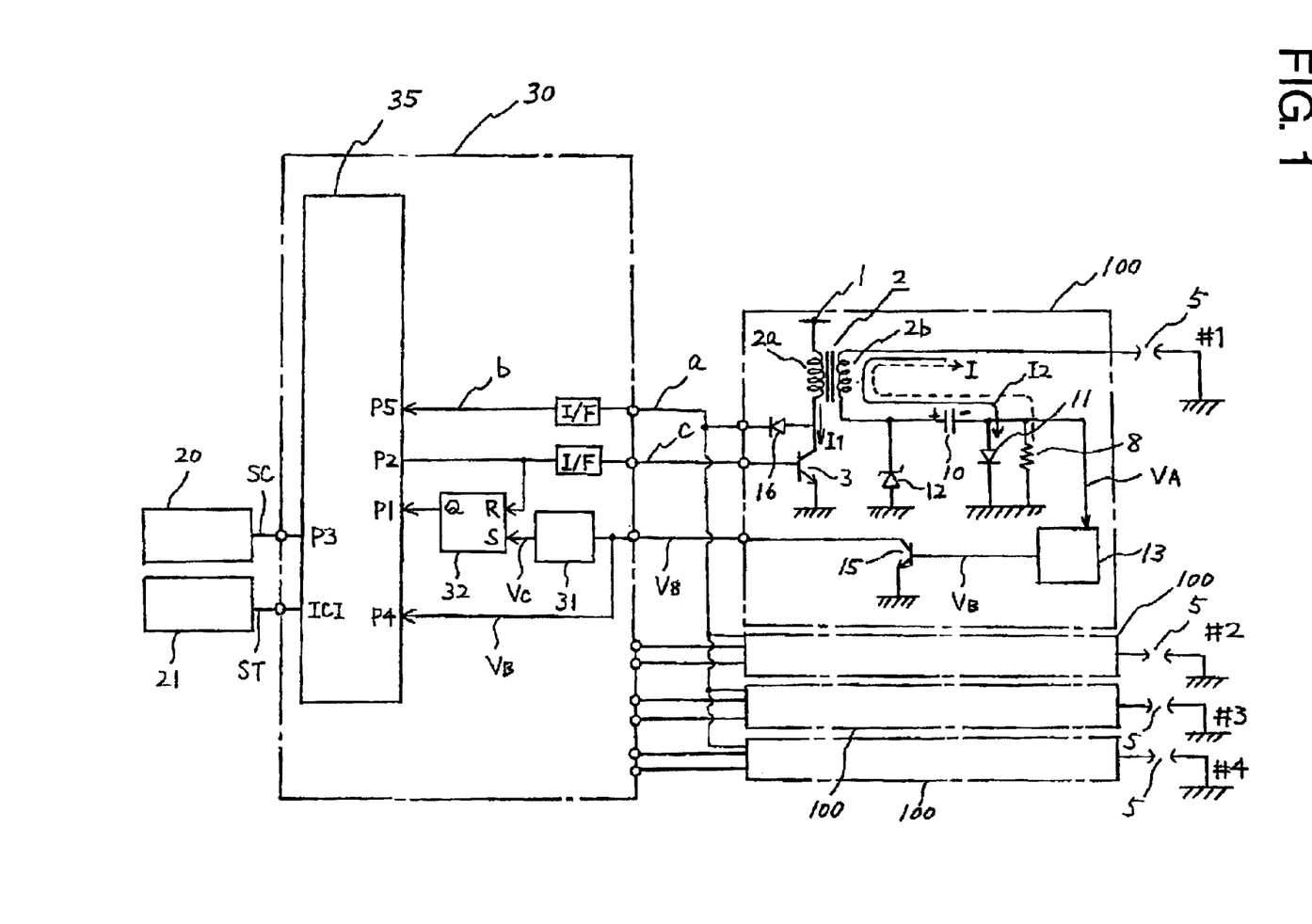
FIG. 1 illustrates a structure of a misfire detecting device for internal combustion engine according to an embodiment of the present invention.
Figure 2:
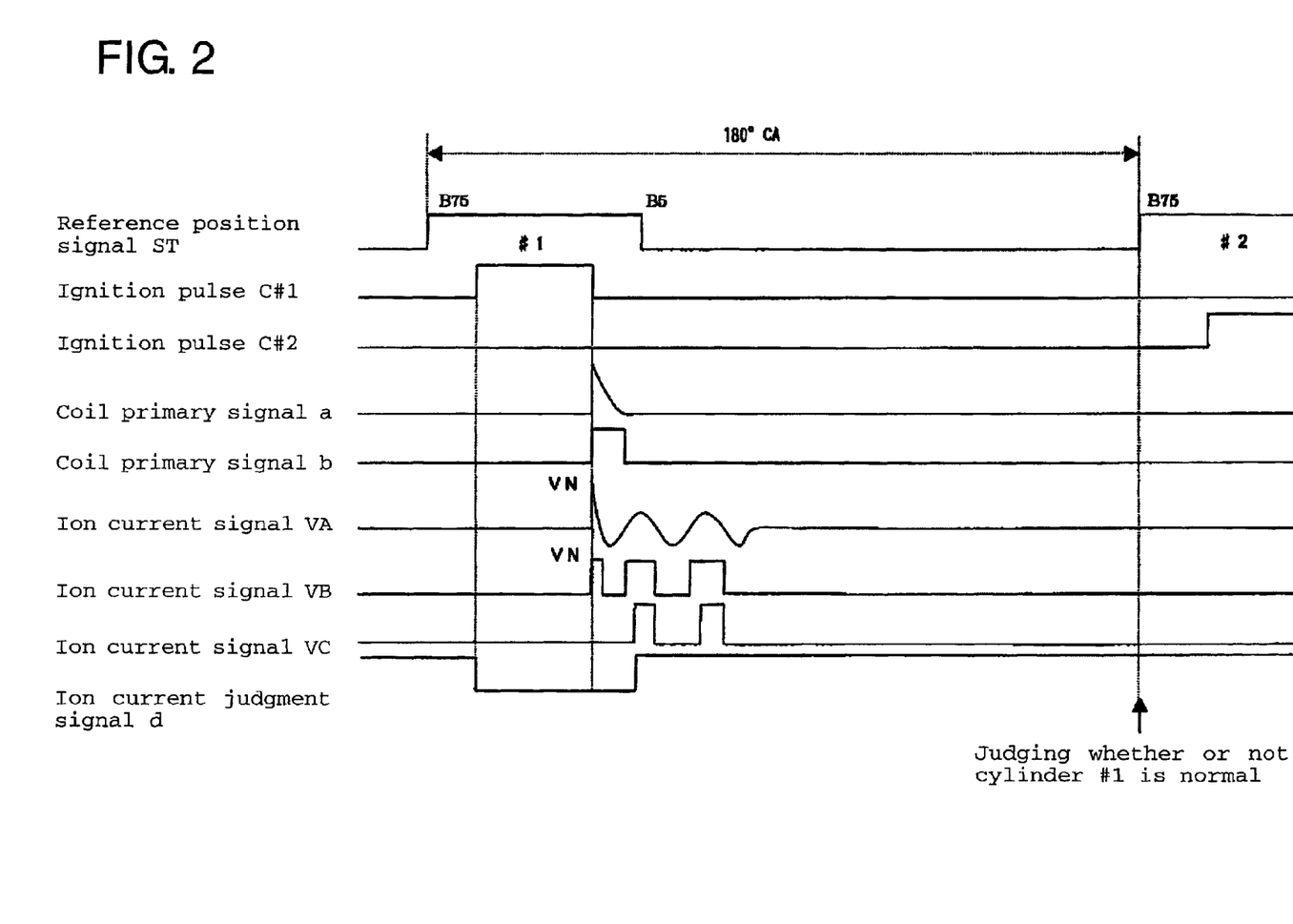
FIG. 2 shows waveforms of signals in the internal combustion engine for explaining an operation of the misfire detecting device in a case where an ion current detecting means is judged to be normal in the embodiment of the present invention.
Figure 3:
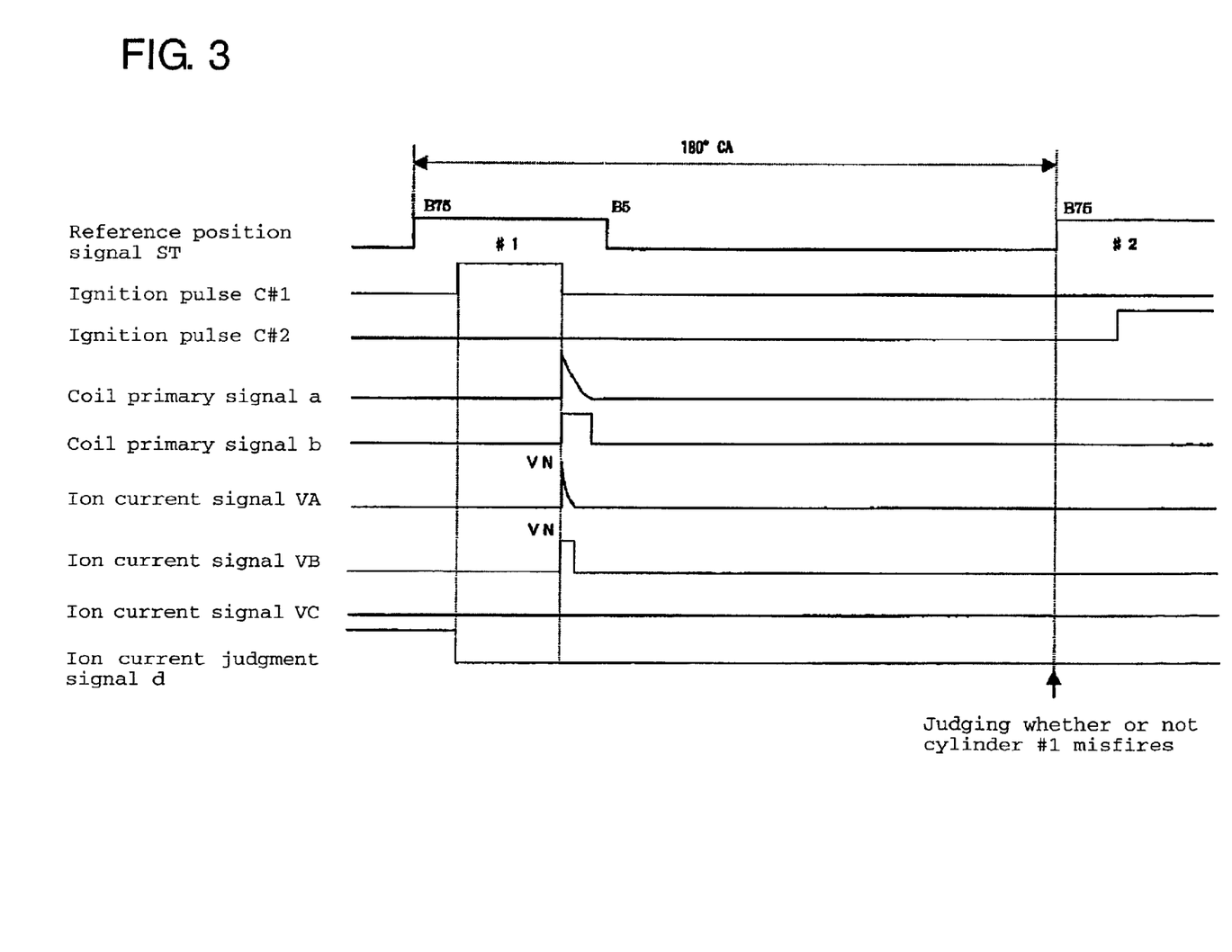
FIG. 3 shows waveforms of the signals in the internal combustion engine for explaining an operation of the misfire detecting device in a case where the internal combustion engine is judged to misfire in the embodiment of the present invention.
Figure 4:
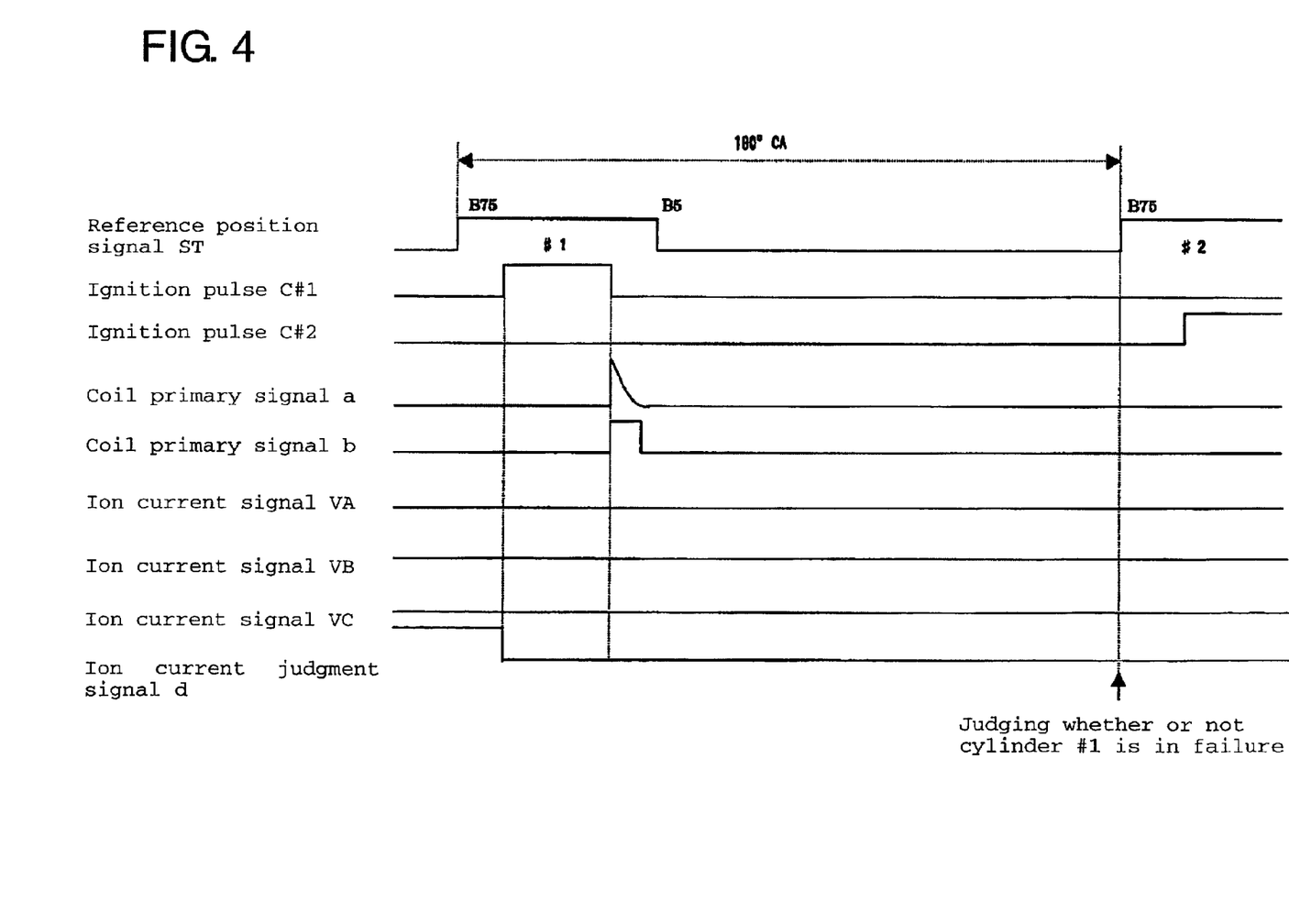
FIG. 4 shows waveforms of the signals in the internal combustion engine for explaining an operation of the misfire detecting device in a case where the ion current detecting means is judged to be in failure according to the embodiment of the present invention.
Figure 5:
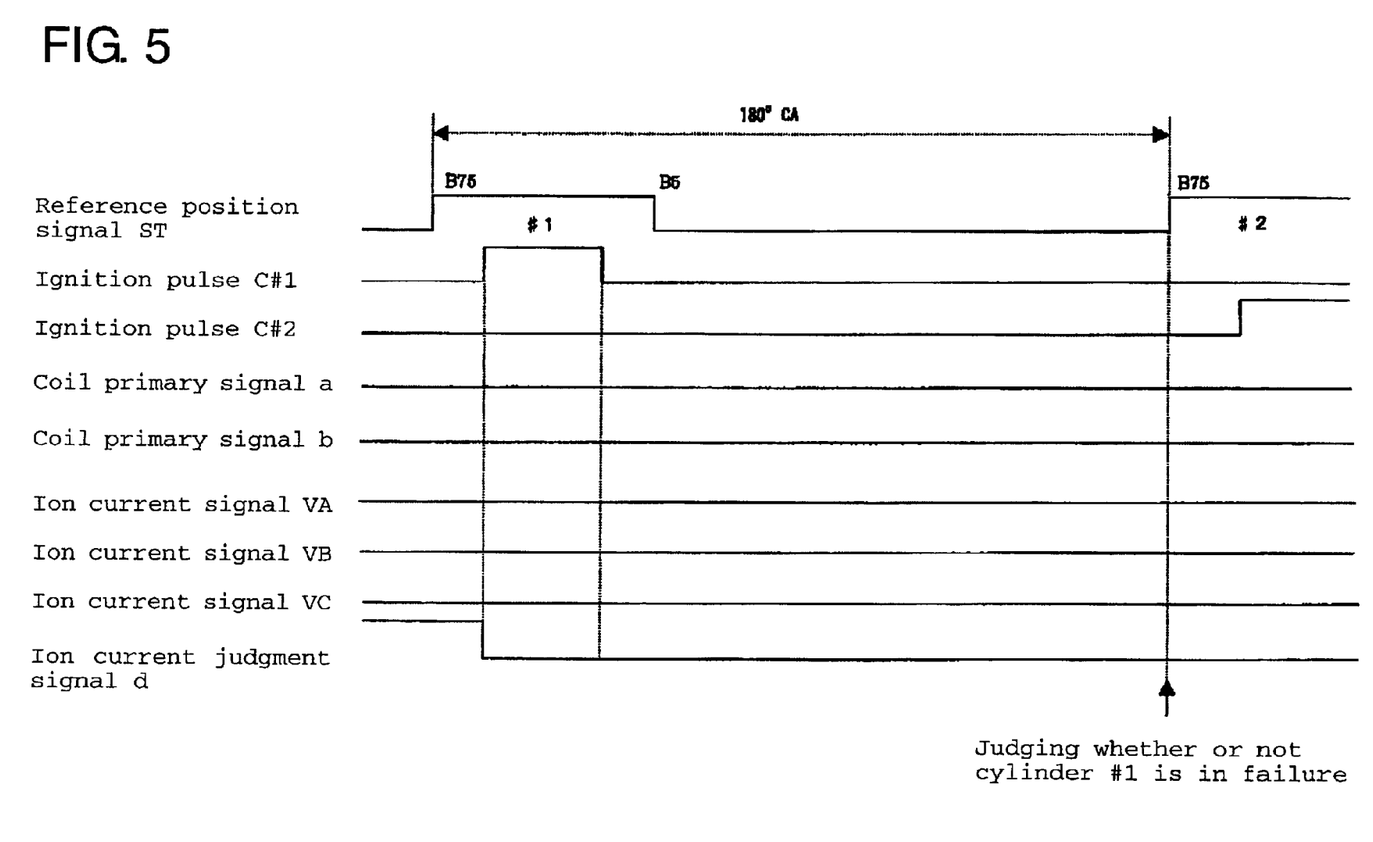
FIG. 5 shows waveforms of the signals in the internal combustion engine for explaining an operation of the misfire detecting device in a case where the ion current detecting means is judged to be in failure according to the embodiment of the present invention.
Figure 6:
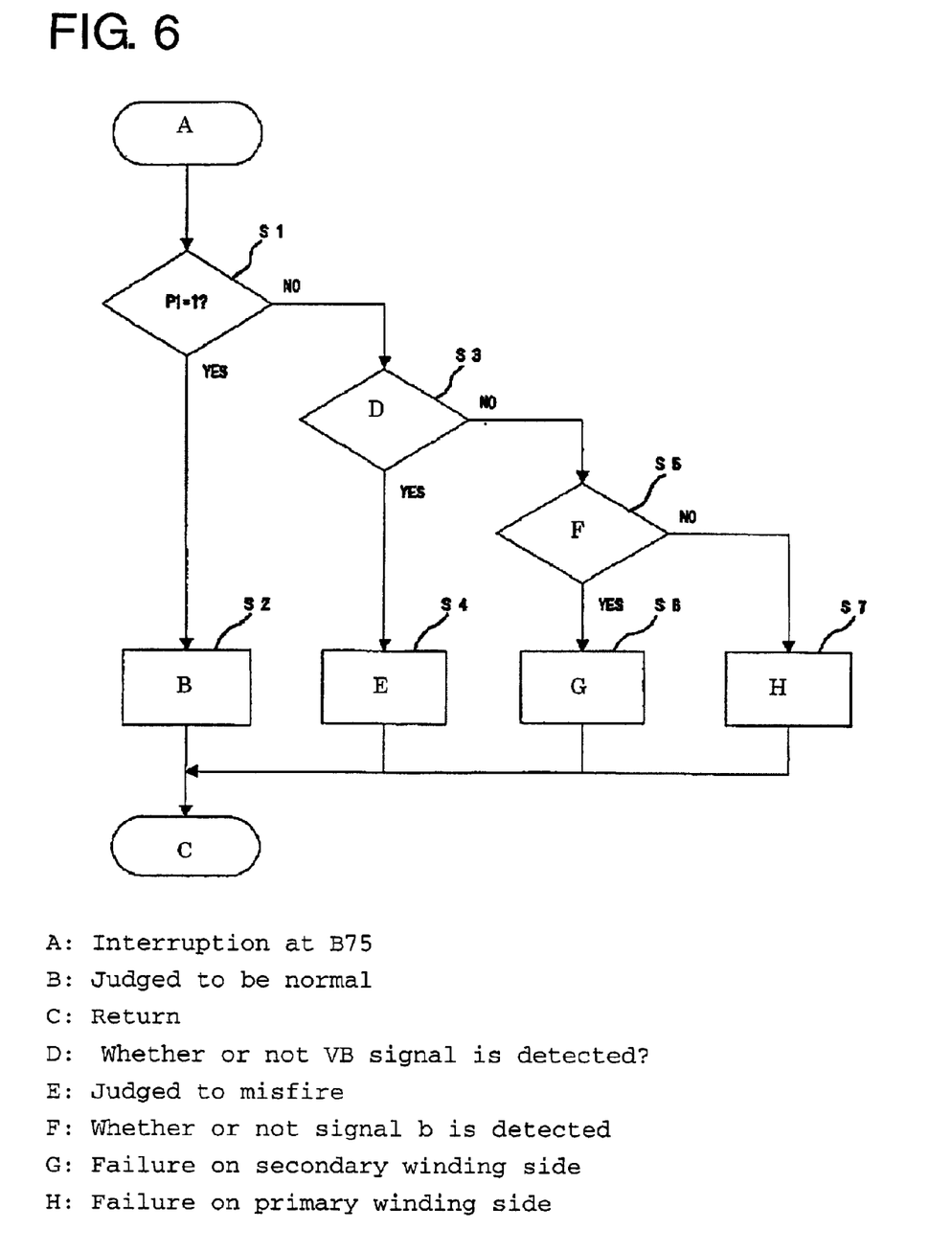
FIG. 6 is a flowchart for showing an operation of the misfire detecting device of the internal combustion engine according to the embodiment of the present invention.

FIG. 1 illustrates a structure of a misfire detecting device of an internal combustion engine according to the embodiment of the present invention. FIGS. 2 through 5 show waveforms of signals for explaining an operation of the misfire detecting device of the internal combustion engine according to the embodiment. FIG. 2 is for the case where an ion current detecting means is judged to be normal; FIG. 3 is for the case where the internal combustion engine is judged to misfire; and FIGS. 4 and 5 are for the case where the ion current detecting means is judged to be in failure. FIG. 6 is a flowchart illustrating an operation of the misfire detecting device of the internal combustion engine according to this embodiment.

In FIG. 1, numerical reference 1 designates a power source connected to a battery; numerical reference 2 designates an ignition coil having a primary winding 2a and a secondary winding 2b, the windings are connected to the power source 1 at each one of the ends; and numerical reference 3 designates a power transistor inserted between the primary winding 2a and a ground. Numerical reference 5 designates a spark plug, connected to the secondary winding 2b at one end and grounded at the other end, wherein the spark plug is respectively provided for a plurality of cylinders, for example, cylinders #1 to #4 and exposed to each combustion chamber. Numerical reference 10 designates a capacitor connected to the secondary winding 2b of the ignition coil 2 and inserted in a path of a secondary current including the secondary winding 2b and the spark plug 5, i.e. a path of an ignition current I2. In this case, a resistor 8 is inserted in a path of an ion current I including the capacitor 10 and the spark plug 5.

Numerical reference 11 designates a diode for charging inserted between the capacitor 10 and a ground, wherein the diode is connected a forward direction with respect to the ignition current I2 and connected to the resistor 8 for detecting the ion current in parallel.

Numerical reference 12 designates a Zener diode for clipping a voltage charged in the capacitor 10 at a time of ignition.

Numerical reference 13 designates a waveform shaping circuit for converting an ion current signal VA to a rectangular wave; and numerical reference 15 designates a transistor outputting the ion current signal VC. The resistor 8, the capacitor 10, the diode for charging 11, the Zener diode 12, the waveform shaping circuit 13, and the transistor 15 form the ion current detecting means for detecting an ion current I generated between 15 electrodes of the spark plug 5. An igniter 100 including the ion current detecting means is respectively provided for the cylinders. In FIG. 1, an example that four cylinders #1 to #4 are used is illustrated.

An ECU 30 has a noise filter for removing a superposed noise from an ion current signal VC, a flip-flop to which the ion current signal VC is set and inputted through a noise filter 31, and a microcomputer 35 to which an output Q from the flip-flop 32, a cylinder identifying signal SC, and a reference position signal ST are inputted.

The microcomputer 35 includes ports P1 to P5 and an interrupt input terminal ICI. The output Q from the flip-flop 32 is inputted as an ion current judgment signal d to the port P1, an ignition pulse c is outputted from the port P2 and inputted in the flip-flop 32 for resetting, the cylinder identification signal SC is inputted in the port P3 from the cylinder identification sensor 20, an ion current signal VB is inputted in the port P4, a coil primary signal b, obtained by converting a coil primary signal a in the ignition coil 2 to a rectangular wave is inputted in the port P5, and a reference position signal ST from a crank angle sensor 21 is inputted in the interrupt input terminal ICI.

The flip-flop 32 forms an ion current judging means for judging whether or not the ion current I exists at each ignition cycle. Further, the microcomputer 35 includes a cylinder identifying means for identifying cylinders based on the cylinder identification signal SC, a misfire judging means for judging that the internal combustion engine misfires in a case that the ion current I is judged not to exist by reading output signals from the ion current judging means, i.e. the ion current judgment signal d (the output Q from the flip-flop 32) at each predetermined timing corresponding to the ignition cycle, e.g. the reference B75 advancing a crank angle of 75° from the top dead center TDC, a misfired cylinder identifying means for identifying a misfired cylinder based on the cylinder identifying means and the misfire judging means, an ignition coil signal judging means for judging whether or not the coil primary signal b from the ignition coil exists, and a failure judging means for judging that the ion current detecting means is in failure in a case where the ion current signal VB is not detected.

Next, an operation will be described in reference of FIGS. 1 through 5. As described, when electricity from the power source 1 is turned off by the primary winding 2a of the ignition coil 2, a high voltage having a polarity shown on the side of the secondary winding 2b in FIG. 1 is generated, and the ignition current I2 flows through a path represented by a full line in FIG. 1 through the spark plug 5, the secondary winding 2b, the capacitor 10, and the diode 11 for charging. A voltage having a polarity shown in the figure is charged in the capacity 10 by the ignition current I2.

When discharge occurs between the electrodes of the spark plug 5 in explosion strokes of the cylinders and the explosion are normal, positive ions produced in the combustion chamber flow as the ion current through the resistor 8, the capacity 10, the secondary winding 2b, and the spark plug 5 along a path represented by a broken line in FIG. 1, whereby the charged voltage in the capacitor 10 is discharged.

The ion current I is continuously detected with respect to, for example, cylinders #1 through #4 of an engine having four cylinders. As illustrated in FIGS. 2 to 5, the ion current signal VA is generated between both ends of the resistor 8 in response to the level of the ion current I, converted to the ion current signal VB in the rectangular waveform by the waveform shaping circuit 13, and finally outputted as the ion current signal VB from the transistor 15. Succeedingly, the ion current signal VB is inputted in the ECU 30 as a digital signal.

Because the first pulse from the ion current signal VB is an ignition noise VN, the ignition noise VN is removed by an ignition noise filter 31 in the ECU 30. The noise superposed in transmitting the ion current signal VB is removed from the ion current signal VB to make the ion current signal VC. The ion current signal VC is inputted in a set terminal S of the flip-flop 32. The output Q from the flip-flop 32 becomes "H", and inputted in the port P1 of the microcomputer 30 as the ion current judgment signal d. Although the ion current signal VC has a plurality of pulses with respect to a single detection of the ion current as illustrated in FIGS. 2 to 5, the output Q is maintained to be "H".

An ignition pulse c is generated at a time that the microcomputer 30 controls ignition at an optimum timing for each of the cylinders based on the cylinder identification signal SC and the reference position signal ST is outputted from the port P2 and received by a reset terminal R of the flip-flop 32. At this time, the output Q from the flip-flop 32 becomes "L" and inputted in the port P1 of the microcomputer 30.

The cylinders are subjected to ignition at around a numerical reference B5 in FIGS. 2 to 5, and the ion current I is generated immediately after the ignition. Therefore, the flip-flop 32 is reset at each ignition pulse c as described, and the ion current judgment signal d is read at a timing of the reference position B75. Therefore, the microcomputer 35 securely judges whether or not the ion current I exists.

As shown in FIG. 2, if the ion current judgment signal d is "H" at the reference position B75 in ignition of the cylinder #2 subjected to ignition immediately after the cylinder #1 to be detected, it is judged that the ion current I is not detected and the ignition in the cylinder to be detected is normal.

Further, as illustrated in FIG. 5, if the ion current judgment signal d is "L" at the reference position B75 in ignition of the cylinder #2 subjected to ignition immediately after the cylinder to be detected #1, it is judged that the ion current is not detected and whether or not the ion current signal VB inputted in the port P4 of the microcomputer 30 is detected. Although it is not illustrated, the ion current signal VB is held after the output of the ignition pulse c and cleared at the time of reading the signal at the reference B75. If VB is detected at this time, "misfire" in the cylinder to be detected is judged.

Further, if the ion current signal VB is not detected, "failure" in the ion current detecting means is judged, wherein if the coil primary signal b from the ignition coil 2 inputted in the port P5 of the microcomputer 30 exists as illustrated in FIG. 4, a failure on a side of the secondary winding 2b is judged, and if the coil primary signal b does not exist as illustrated in FIG. 5, a failure on a side of the primary winding 2a is judged.

Next, an operation of failure judgment of the ion current detecting means will be described in reference of the flowchart in FIG. 6. First in an interrupt routine at the numerical reference B75 for reading the ion 15 current judgment signal d, it is judged whether or not the ion current judgment signal d is 1, i.e. the ion current signal VC exists, in Step S1. If d equals to 1, it is judged that ignition in the cylinder to be detected is normal in Step S2.

If the ion current judgment signal d is 0, i.e. the ion current signal VC does not exist, in Step S1, it is judged whether or not the ion current signal VB is detected in Step S3. If the ion current signal VB is detected, "misfire" is judged to occur in Step S4. If the ion current signal VB is not detected in Step S3, it is judged whether or not the coil primary signal b is detected in Step S5. If the coil primary signal b is detected, "failure" on the side of the secondary winding 2b is judged to occur in Step S6. If the coil primary signal b is not detected in Step S5, "failure" on the side of the primary winding 2a is judged to occur in Step S7.

Figure 7:
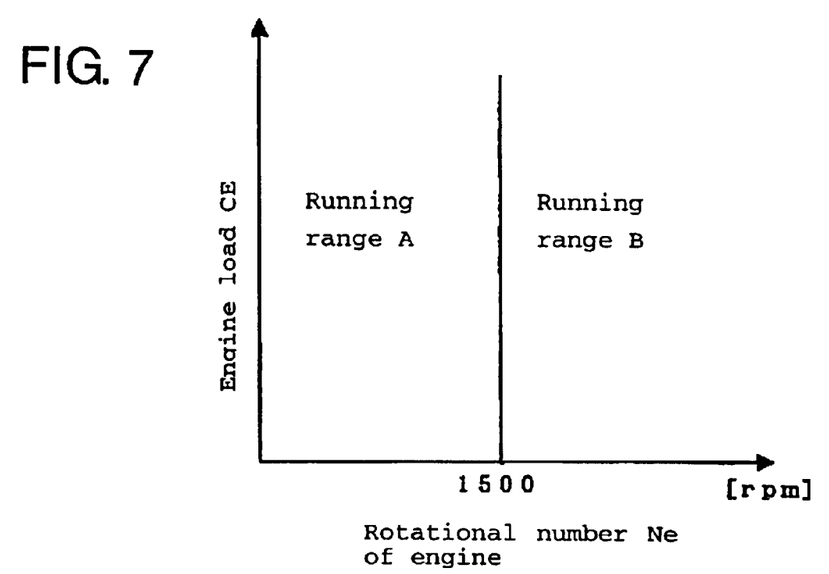
FIG. 7 illustrates running regions of the internal combustion engine used in the misfire detecting device according to the embodiment of the present invention.

There is tendency that an accuracy of the above-mentioned detection of the ion current signal is deteriorated in a range of low number of revolution in the engine. FIG. 7 illustrates running ranges of the engine used in the misfire detection device according to this embodiment. In the figure, the ordinate represents an engine load such as an intake air quantity, and the abscissa represents the number of revolution Ne of the engine. The running range A is a range of low number of revolution corresponding to an idling speed, for example less than 1,500 rpm, and the range B is a range of middle or high number of revolution, for example 1,500 rpm or more. In other words, by performing the failure judgment of the ion current detection means in a predetermined running range where the ion current signal is detectable, particularly in the running range B shown in FIG. 7 and prohibiting the failure judgment in the range of low number of revolution such as the running range A, it is possible to securely prevent an erroneous misfire judgment.

The advantage of the misfire detection device according to the present invention is that an erroneous misfire judgment can be securely prevented by judging a failure in the ion current detection means.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2001-370032 filed on Dec. 4, 2001 including specification, claims, drawings and summary are incorporated herein by reference in its entirety.

What is claimed is:

1. A misfire detecting device for an internal combustion engine comprising:
   an ion current detecting means for detecting ion currents generated between electrodes of spark plugs corresponding to a plurality of cylinders;

an ion current judging means for judging whether or not the ion current exists at each ignition cycle of each cylinder based on the ion current signal from the ion current detecting means;

a misfire judging means for judging that a misfire occurs when no ion current is judged to exist based on an ion current judgment signal from the ion current judging means;

an ignition coil for generating an ignition signal for each of the spark plugs;

an ignition coil signal judging means for judging whether or not a voltage signal at a primary winding of the ignition coil generated in synchronism with an ignition timing of the ignition coil exists; and a failure judging means for judging whether or not an failure of the ion current detecting means occurs based on a result from the ignition coil signal judging means in a case where the ion current signal is not detected.

2. The misfire detecting device for internal combustion engine according to claim 1, wherein the failure judging means judges whether or not a failure of the ion current detecting means exists in a predetermined running range where the ion current is detectable.

* * * * *